Patented Mar. 6, 1923.

1,447,501

UNITED STATES PATENT OFFICE.

JEAN ALTWEGG, OF LYON, FRANCE, ASSIGNOR TO SOCIETE CHIMIQUE DES USINES DU RHONE, OF PARIS, FRANCE.

PROCESS FOR THE PREPARATION OF BASIC SALICYLATE OF ALUMINUM.

No Drawing. Application filed August 4, 1921. Serial No. 489,741.

*To all whom it may concern:*

Be it known that I, JEAN ALTWEGG, residing at Lyon, France, a citizen of the Confederation of Switzerland, have invented certain new and useful Improvements in Processes for the Preparation of Basic Salicylate of Aluminum, of which the following is a specification.

It is only the neutral aluminum salicylate of the formula $(C_6H_4OHCO_2)_6Al_2+3H_2O$ which is applied in therapeutics and is brought into external use under the term "saluminium insolubile" as a dusting powder. Basic aluminum salicylates have not been described, in literature there is found only the statement, that the neutral salt when warmed with water becomes decomposed into free salicylic acid and basic salt.

It has been found that the basic salt of the formula $C_6H_4OHCO_2Al(OH)_2$ represents an excellent remedy for intestinal catarrh and diarrhœa of every type. This salicylate is to be distinguished from the neutral and the lesser basic salts by its stability in presence of water and diluted acids even at higher temperatures. The salicylate can therefore, when taken "per os," pass the stomach without becoming decomposed, which fact in the case of a remedy for the intestines is to be considered as a particularly favourable feature.

If the preparation be attempted by employing the decomposition of the neutral salt with hot water, then, even after repeated and prolonged treatment, the product with a content of 27.75% $Al_2O_3$ and having the described properties will not be obtained. Also by the mixing of a solution of an aluminum salt, for example, aluminum sulfate, with a salicylate solution, for example, sodium salicylate, in molecular proportion, the desired basic salicylate of aluminum is not precipitated in a homogeneous state.

It has now been found that the described salt can be prepared with a constant composition in a surprisingly simple manner when a molecular mixture of aluminum hydroxide and salicylic acid is stirred in water, the reaction being favoured by warming.

For the execution of this process, the aluminum hydroxide dried at a temperature not exceeding 100° can be brought into a state of suspension by means of good stirring in hot water and then, one molecule of finely powdered salicylic acid can be slowly added. The acid reaction of the mass, which sets in upon each addition, in each case disappears after some time. It is finally filtered and dried at 125°–130°. The basic salicylate thus obtained is in the form of a fine, colourless, at times somewhat reddish, powder with a content of 25.75% of $Al_2O_3$. Molecular quantities of salicylic acid and aluminum hydroxide can, with still greater advantage, be stirred with water to a mash and warmed in the water bath until a homogeneous paste with neutral reaction is constituted which is dried at a temperature of 125°–130°.

What I claim and desire to secure by Letters Patent is:—

Process for the preparation of the basic salicylate of aluminum of the formula $C_6H_4OHCO_2Al(OH)_2$, characterized hereby that aluminum hydroxide and salicylic acid in molecular proportions are mixed in the presence of water, the reaction being favoured by warming.

In testimony whereof I have signed my name to this specification.

JEAN ALTWEGG.

Witness:
L. ESCHER.